US009230219B2

(12) United States Patent
Fang et al.

(10) Patent No.: US 9,230,219 B2
(45) Date of Patent: Jan. 5, 2016

(54) WIND ENERGY FORECASTING METHOD WITH EXTREME WIND SPEED PREDICTION FUNCTION

(71) Applicant: Institute of Nuclear Energy Research, Atomic Energy Council, Executive Yuan, Longtan Township, Taoyuan County (TW)

(72) Inventors: Hsin-Fa Fang, Zhubei (TW); Ing-Jane Chen, Taipei (TW)

(73) Assignee: INSTITUTE OF NUCLEAR ENERGY RESEARCH ATOMIC ENERGY COUNCIL, EXECUTIVE YUAN, Taoyuan County (TW)

( * ) Notice: Subject to any disclaimer, the term of this patent is extended or adjusted under 35 U.S.C. 154(b) by 109 days.

(21) Appl. No.: 14/447,094

(22) Filed: Jul. 30, 2014

(65) Prior Publication Data

US 2014/0344209 A1 Nov. 20, 2014

Related U.S. Application Data

(63) Continuation-in-part of application No. 13/161,828, filed on Jun. 16, 2011, now abandoned.

(30) Foreign Application Priority Data

Aug. 23, 2010 (TW) ................................ 99128145 A (51) Int. Cl.
*G01W 1/00* (2006.01)
*G06N 7/00* (2006.01)
(Continued)

(52) U.S. Cl.
CPC ................. *G06N 7/005* (2013.01); *G01W 1/10* (2013.01); *G06Q 10/06* (2013.01); *G06Q 50/06* (2013.01); *F05B 2260/821* (2013.01); *G06F 17/18* (2013.01)

(58) Field of Classification Search
CPC ........................................................ G01W 1/10
See application file for complete search history.

(56) References Cited

U.S. PATENT DOCUMENTS 7,219,015 B2 * 5/2007 Bresch et al. ..................... 702/3
7,970,543 B2 * 6/2011 Powell et al. ..................... 702/9
(Continued)

OTHER PUBLICATIONS

Kaplan, et al., "A Simple Empirical Model for Predicting the Decay of Tropical Cyclone Winds after Landfall", Journal of Applied Meteorology, Nov. 1995, vol. 34, pp. 2499-2512.

*Primary Examiner* — Timothy H Hwang
(74) *Attorney, Agent, or Firm* — Muncy, Geissler, Olds & Lowe, P.C.

(57) ABSTRACT

A computer-executable method is executed by a CPU as the following steps of: obtaining an interested range in relation to a target typhoon and obtaining historical typhoons within the interested range from a wind and typhoon database; obtaining shortest distances from the respective historical typhoons to the target typhoon within the interested range; choosing a target ground grid point and obtaining normalized extreme wind speeds of the respective historical typhoons corresponding to the target ground grid point; obtaining extreme wind speeds probable for the target ground grid point by calculation according to the normalized extreme wind speeds and the highest wind speed of the center of the target typhoon; and arranging the extreme wind speeds in descending order, arranging the shortest distances corresponding to the respective extreme wind speeds, and obtaining the occurrence probability of the extreme wind speeds at the target ground grid point according to a formula.

14 Claims, 7 Drawing Sheets

(51) Int. Cl.
  *G01W 1/10* (2006.01)
  *G06Q 10/06* (2012.01)
  *G06Q 50/06* (2012.01)
  *G06F 17/18* (2006.01)

(56) References Cited

U.S. PATENT DOCUMENTS

| | | | |
|---|---|---|---|
| 8,224,768 B1 * | 7/2012 | Crawford et al. | 706/62 |
| 8,280,633 B1 | 10/2012 | Eldering et al. | |
| 2007/0071604 A1 | 3/2007 | Suzuki | |
| 2007/0093964 A1 * | 4/2007 | Bresch et al. | 702/3 |
| 2007/0168155 A1 * | 7/2007 | Ravela et al. | 702/179 |
| 2007/0185653 A1 * | 8/2007 | Bresch et al. | 702/3 |
| 2007/0223841 A1 * | 9/2007 | Weinzapfel et al. | 382/325 |
| 2007/0225915 A1 * | 9/2007 | Weinzapfel et al. | 702/3 |
| 2011/0018271 A1 * | 1/2011 | Karikomi et al. | 290/44 |
| 2011/0040550 A1 | 2/2011 | Graber et al. | |
| 2012/0046917 A1 * | 2/2012 | Fang et al. | 703/1 |

* cited by examiner

| typhoon number | distance of the target typhoon (km) | extreme wind speed of target ground grid point (m/s) |
|---|---|---|
| 1 | 55 | 25 |
| 2 | 15 | 35 |
| 3 | 12 | 45 |
| 4 | 20 | 65 |
| 5 | 21 | 23 |
| 6 | 3 | 45 |
| 7 | 9 | 55 |
| 8 | 7 | 19 |
| 9 | 15 | 20 |
| 10 | 18 | 50 |
| 11 | 5 | 82 |
| 12 | 19 | 41 |
| 13 | 58 | 32 |
| 14 | 21 | 25 |
| 15 | 15 | 14 |
| 16 | 28 | 12 |
| 17 | 54 | 28 |
| 18 | 25 | 48 |
| 19 | 17 | 31 |
| 20 | 24 | 25 |
| 21 | 10 | 36 |
| 22 | 21 | 60 |
| 23 | 32 | 41 |
| 24 | 25 | 70 |
| 25 | 33 | 68 |
| 26 | 25 | 18 |
| 27 | 50 | 26 |
| 28 | 19 | 38 |
| 29 | 29 | 56 |
| 30 | 35 | 48 |

FIG.3B

| typhoon number | distance of target typhoon (km) | extreme wind speed of target grid point (m/s) | accumulated probability (%) | occurrence probability (%) |
|---|---|---|---|---|
| 16 | 28 | 12 | 1.8 | 1.8 |
| 15 | 15 | 14 | 5.2 | 3.4 |
| 26 | 25 | 18 | 7.2 | 2.0 |
| 8 | 7 | 19 | 14.4 | 7.2 |
| 9 | 15 | 20 | 17.8 | 3.4 |
| 5 | 21 | 23 | 20.2 | 2.4 |
| 1 | 55 | 25 | 21.1 | 0.9 |
| 14 | 21 | 25 | 23.5 | 2.4 |
| 20 | 24 | 25 | 25.6 | 2.1 |
| 27 | 50 | 26 | 26.6 | 1.0 |
| 17 | 54 | 28 | 27.6 | 1.0 |
| 19 | 17 | 31 | 30.5 | 2.9 |
| 13 | 58 | 32 | 31.4 | 0.9 |
| 2 | 15 | 35 | 34.8 | 3.4 |
| 21 | 10 | 36 | 39.8 | 5.0 |
| 28 | 19 | 38 | 42.5 | 2.7 |
| 12 | 19 | 41 | 45.1 | 2.6 |
| 23 | 32 | 41 | 46.7 | 1.6 |
| 3 | 12 | 45 | 50.9 | 4.2 |
| 6 | 3 | 45 | 67.8 | 16.9 |
| 18 | 25 | 48 | 69.8 | 2.0 |
| 30 | 35 | 48 | 71.2 | 1.4 |
| 10 | 18 | 50 | 74.1 | 2.9 |
| 7 | 9 | 55 | 79.7 | 5.6 |
| 29 | 29 | 56 | 81.4 | 1.7 |
| 22 | 21 | 60 | 83.8 | 2.4 |
| 4 | 20 | 65 | 86.3 | 2.5 |
| 25 | 33 | 68 | 87.9 | 1.6 |
| 24 | 25 | 70 | 89.9 | 2.0 |
| 11 | 5 | 82 | 100.0 | 10.1 |

WIND ENERGY FORECASTING METHOD WITH EXTREME WIND SPEED PREDICTION FUNCTION

CROSS REFERENCE TO RELATED APPLICATIONS

This application is a Continuation-In-Part of U.S. application Ser. No. 13/161,828 filed on Jun. 16, 2011, which claims priority under 35 U.S.C. §119(a) on patent application No(s). 099128145 filed in Taiwan, Republic of China on Aug. 23, 2010, the entire contents of which are hereby incorporated by reference.

BACKGROUND OF THE INVENTION

1. Field of Invention

The invention relates to a wind energy forecasting method with extreme wind speed prediction function.

2. Related Art

Due to the problems of energy deficiency, global warming and serious climatic changes, using renewable resources for power generation has become the proper solution to the problems. Renewable resources include wind energy, solar energy, biomass energy, geothermal energy, etc. Because of lower cost and high economic effect, wind power generation has been developed rapidly in the past few years.

In general, a wind power generator includes an impeller, a gearbox, a power generator, a shifting apparatus and a controlling system. The impeller has a set of blades well designed by fluid dynamics and installed to the axle. When wind passes through the blades, the impeller can be forced to rotate, resulting in kinetic power that is transmitted through the transmission system and gearbox to the power generator to generate electricity. The controlling system can control the shifting apparatus according to the wind direction signal from the wind direction sensor, so that the wind power generator can automatically maintain the proper orientation against the wind to optimize the power generation efficiency.

Strong and predictable output of wind energy is the primary requisite to develop wind power generation. However, the wind as the source of the wind power generation is naturally generated and unstable, so a well developed wind energy prediction system is needed to improve the usage of wind power generation and keep the security of power supply system.

In practical operations, the short-term wind energy forecasting can predict and follow the output variations of wind power generation at the wind farms within 48 hours in the future, which can increase the electricity output of the wind farm. For purpose of maintenance, the prediction with a longer scale is used to determine the timing of maintenance so that the cost of power generation business can be lowered down. Accordingly to the estimation of a famous wind energy consultant company, the short-term wind energy prediction can bring the benefit of 7 Euros per million watt hour (MWH) by considering a single wind farm in Spain. Of course, the combination prediction of plural wind farms can be more precisely and get more benefit. Therefore, many countries are devoted to the wind energy prediction system and technology to enhance the business efficiency of wind farms.

Taiwan is an island nation located in the western Pacific Ocean. Taiwan suffers many typhoons every year, and besides, the undulation of Taiwan's landform varies a lot, with more than 100 mountains higher than 3000 meters. Therefore, the track and strength of the typhoon always varies capriciously when typhoons pass through Taiwan. Typhoons had destroyed a lot of wind turbines in Taiwan. Different kinds of wind turbines designed to against different levels of strength of the wind speed, if the extreme wind speed exceeds the upper limitation of the wind turbine, the security problem of the wind turbine will occur.

Therefore, it is a very important subject to provide a wind energy forecasting method with extreme wind speed prediction function that can provide wind energy prediction with considering the specific weather (e.g. typhoons, hurricanes, etc.) so as to improve the efficiency of wind power generation, and can predict the extreme wind speed of the typhoon when the typhoon comes so as to avoid the security problem of the wind turbines.

SUMMARY OF THE INVENTION

In view of the foregoing subject, an objective of the invention is to provide a wind energy forecasting method with extreme wind speed prediction function that can make wind energy prediction so as to improve the usage efficiency of wind power generation, and can predict the extreme wind speed of the typhoon when it comes so as to solve the security problem of the wind turbines.

To achieve the above objective, a non-transient storage medium having a computer-executable method of predicting the occurrence probability of extreme wind speed of the invention is executed by a CPU as the following steps of: obtaining an interested range in relation to a target typhoon serving as the center and obtaining a plurality of historical typhoons within the interested range from a wind and typhoon database; obtaining a plurality of shortest distances from the respective historical typhoons to the target typhoon within the interested range; choosing a target ground grid point and obtaining a plurality of normalized extreme wind speeds of the respective historical typhoons corresponding to the target ground grid point; obtaining a plurality of extreme wind speeds probable for the target ground grid point by calculation according to the normalized extreme wind speeds and the highest wind speed of the center of the target typhoon; and arranging the extreme wind speeds in descending order, arranging the shortest distances corresponding to the respective extreme wind speeds, and obtaining the occurrence probability of the extreme wind speeds at the target ground grid point according to a formula.

To achieve the above objective, a computer-executable method of predicting the occurrence probability of extreme wind speed of the invention is executed by a CPU as the following steps of: obtaining an interested range in relation to a target typhoon serving as the center and obtaining a plurality of historical typhoons within the interested range from a wind and typhoon database; obtaining a plurality of shortest distances from the respective historical typhoons to the target typhoon within the interested range; choosing a target ground grid point and obtaining a plurality of normalized extreme wind speeds of the respective historical typhoons corresponding to the target ground grid point; obtaining a plurality of extreme wind speeds probable for the target ground grid point by calculation according to the normalized extreme wind speeds and the highest wind speed of the center of the target typhoon; and arranging the extreme wind speeds in descending order, arranging the shortest distances corresponding to the respective extreme wind speeds, and obtaining the occurrence probability of the extreme wind speeds at the target ground grid point according to a formula.

In one embodiment, the occurrence probability of the wind speed values of the normalized extreme wind speeds formed at the target ground grid point is based on the following formula: the respective historical typhoons are at distances R1, R2, R3, ..., Rn from the target typhoon, the ratio of the extreme wind speeds of the occurrence probabilities of the historical typhoons is $$\frac{1}{R1} : \frac{1}{R2} : \frac{1}{R3} : \cdots : \frac{1}{Rn},$$

and a setting is $$\Sigma = \frac{\frac{1}{R1} + \frac{1}{R2} + \frac{1}{R3} + \cdots + \frac{1}{Rn}}{100},$$

so the occurrence probabilities of the extreme wind speeds of the respective historical typhoons are $$\frac{1}{R1 \times \Sigma}\%, \frac{1}{R2 \times \Sigma}\%, \frac{1}{R3 \times \Sigma}\%, \cdots, \frac{1}{Rn \times \Sigma}\%.$$

In one embodiment, according to the normalized extreme wind speeds and the highest wind speed of the center of the target typhoon, the normalized extreme wind speeds of the respective historical typhoons corresponding to the target ground grid point and the highest wind speed of the center of the target typhoon are multiplied together to obtain the extreme wind speeds.

In one embodiment, each of the extreme wind speeds has the corresponding shortest distance of the historical typhoon.

In one embodiment, the computer-executable method of predicting the occurrence probability of extreme wind speed further comprises the following step of: forming an occurrence probability distribution diagram according to the extreme wind speeds and the occurrence probabilities of the extreme wind speeds, and adding a trend curve to the occurrence probability distribution diagram to form an occurrence probability curve of extreme wind speed.

In one embodiment, the equation of the occurrence probability curve is as follows: Y=−51.17Ln(X)+238.56, wherein X denotes the extreme wind speeds and Y denotes the occurrence probabilities of the extreme wind speeds.

In one embodiment, the computer-executable method of predicting the occurrence probability of extreme wind speed further comprises the following step of: modifying the occurrence probabilities of the extreme wind speeds occurring at the target ground grid point by a physical model to modify the target ground grid point to the height or position of a wind turbine.

In one embodiment, the physical model is a wind flow model to modify, through land topography and height, the wind speed and direction of the target ground grid point to the wind speed and direction of the wind turbine.

In one embodiment, the interested range is changed according to the state and position of the target typhoon.

As mentioned above, in the wind energy forecasting method with extreme wind speed prediction function of the invention, the position relation between the historical typhoon and the target typhoon is used and the probable extreme wind speed of the historical typhoon for a target ground grid point is obtained. Thereby, the occurrence probability of the extreme wind speeds can be obtained by calculation according to the shortest distance between the historical typhoon and the target typhoon. Therefore, the extreme wind speed prediction of the typhoon can be implemented and the warning mechanism can be established to secure the wind power generation system.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
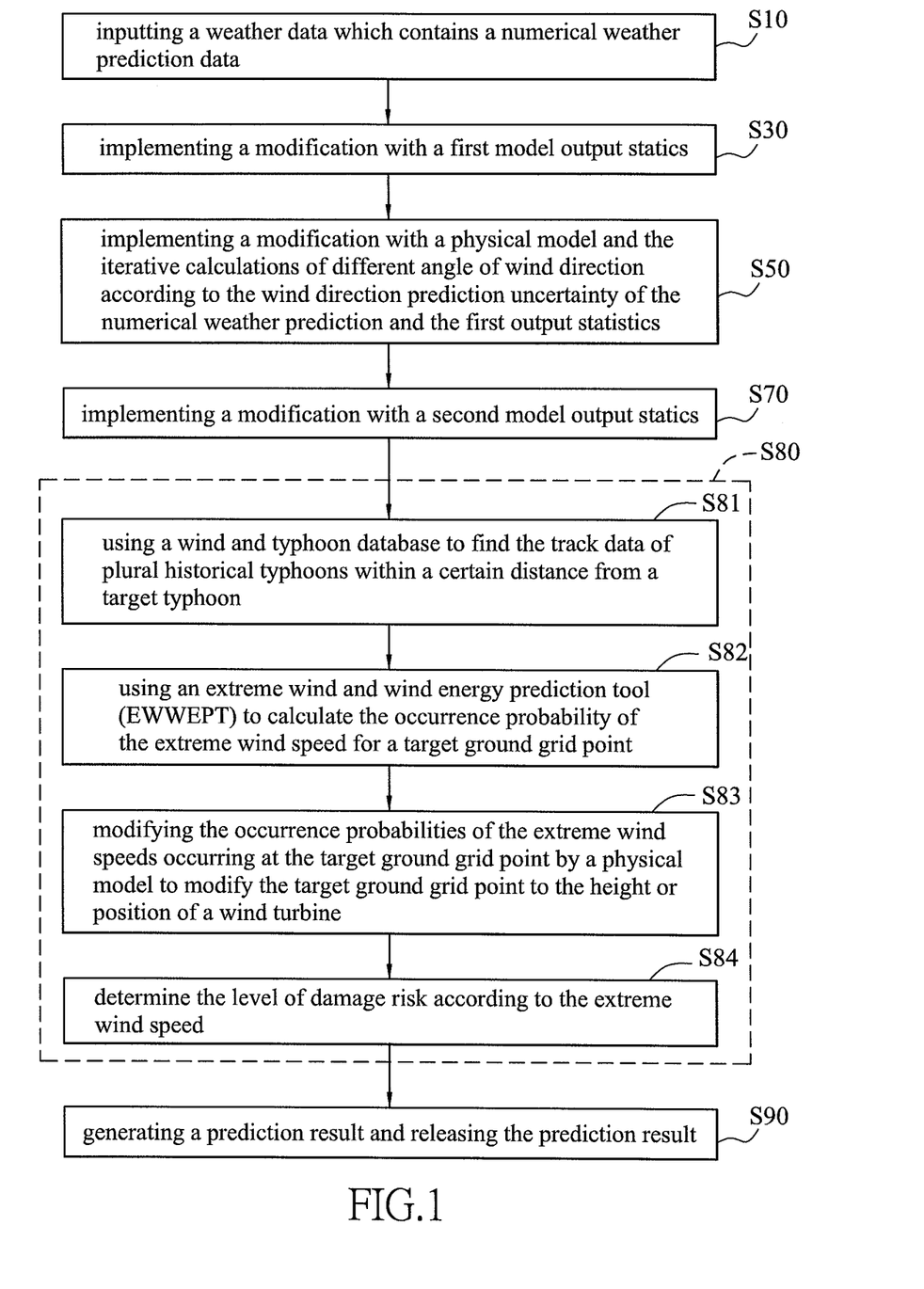
FIG. 1 is a flowchart diagram of a wind energy forecasting method with extreme wind speed prediction function of a preferred embodiment of the invention.

FIG. 1 is a flowchart diagram of the wind energy forecasting method with extreme wind speed prediction function according to a preferred embodiment of the invention. As shown in FIG. 1, the wind energy forecasting method with extreme wind speed prediction function is a computer-executable method and cooperated with a central computer, which includes a CPU, and executed by the CPU as the following steps of: inputting a weather data which contains a numerical weather prediction data (S10), implementing a modification with a first model output statistics (MOS) (S30), implementing a modification with a physical model and the iterative calculations of different angle of wind direction according to the wind direction prediction uncertainty of the numerical weather prediction and the first model output statistics, so that the prediction can cover the variation and probability of the wind energy output caused by the change of the wind direction (S50), implementing a modification with a second model output statistics (S70), and implementing a prediction of damage caused by typhoon (S80). The step S80 includes the following sub-steps of using a wind and typhoon database to find the track data of plural historical typhoons within a certain distance from a target typhoon (S81), using an extreme wind and wind energy prediction tool (EWWEPT) (11) to calculate the occurrence probability of the extreme wind speed for a target ground grid point (S82), and modifying the occurrence probabilities of the extreme wind speeds occurring at the target ground grid point by a physical model to modify the target ground grid point to the height or position of a wind turbine (S83). The steps S82 and S83 can be applied to the method of predicting the occurrence probability of the extreme wind speed. The details of the above steps are described below.

Figure 2:
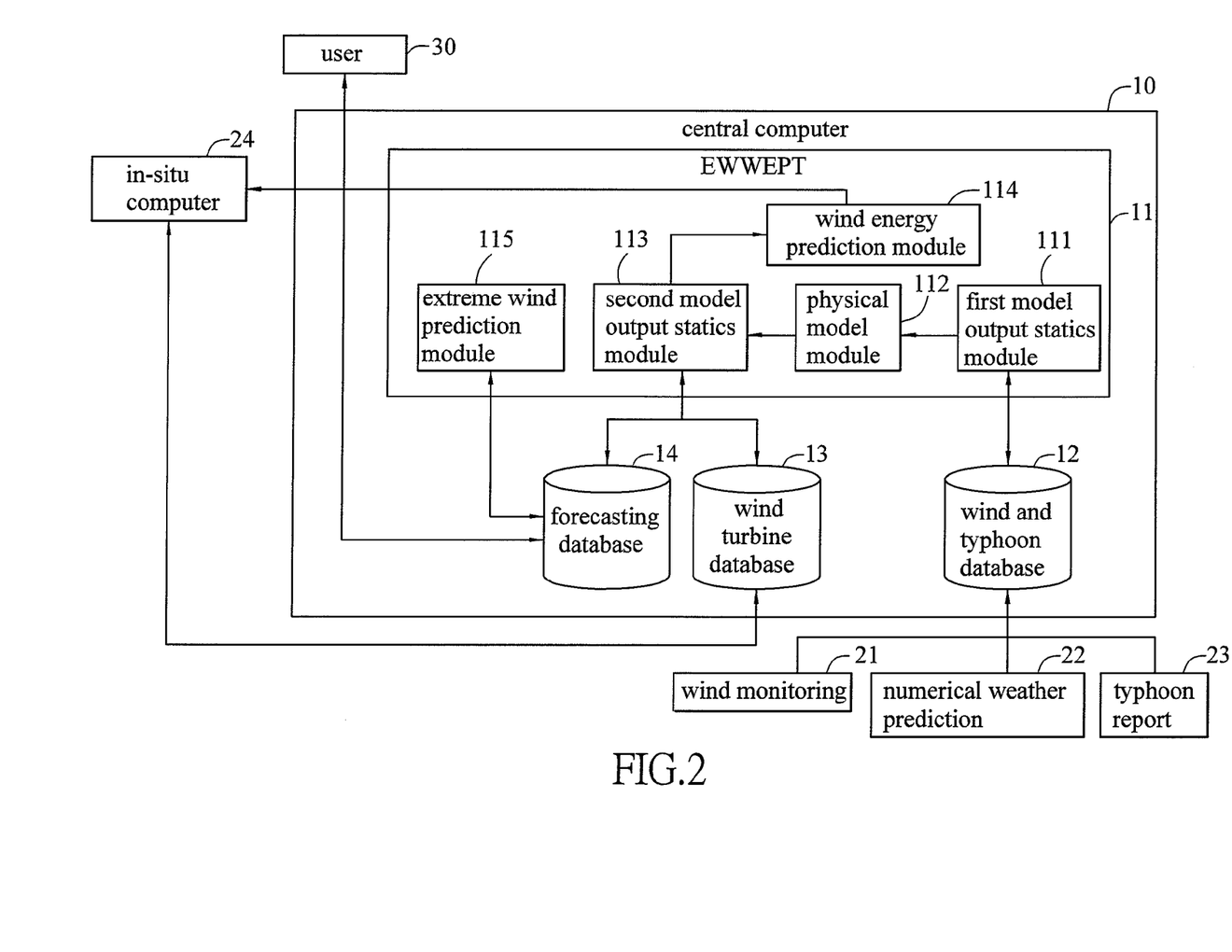
FIG. 2 is a block diagram of a central computer cooperated with the wind energy forecasting method of the preferred embodiment of the invention.

FIG. 2 is a block diagram of the central computer cooperated with the wind energy prediction method of the embodiment. The central computer 10 has the EWWEPT 11, a wind and typhoon database 12, a wind turbine database 13 and a forecasting database 14, and has an interface that can receive the data from the wind monitoring 21, the numerical weather prediction (NWP) 22, the typhoon report 23 and the in-situ computers 24.

The central computer 10 can operate the EWWEPT 11, release the report of extreme wind speed and wind energy prediction to the user 30, and store the result in the forecasting database 14. The user 30 may be an operator of the wind farm, a manager of power transmission and distribution, or a stakeholder of the electricity market.

The EWWEPT 11 includes a first model output statistics module 111, a physical model module 112, a second model output statistics module 113, a wind energy prediction module 114 and an extreme wind prediction module 115.

The wind and typhoon database 12 stores the weather data of the in-situ computer 24 and the wind monitoring station. The weather data contains the data of the wind monitoring 21, the wind data predicted by the numerical weather prediction 22, and the data of the typhoon report 23. The data of the wind monitoring 21 includes, for example, the monitoring result provided by the weather vane, the Doppler radar, and the laser radar. To be noted, the numerical weather prediction 22 is a conventional method of weather prediction, in which the numerical data acquired by the observations of radiosondes, radars, ships, satellites or the like is used to solve the equations of fluid dynamics and thermodynamics describing the weather development to predict the future weather. The typhoon report 23 can be made by various institutions, which relates to the data of typhoon position and strength and the original wind map data provided by the weather institution. The typhoon position and strength data includes the time and position of the modified track of typhoon and the highest wind speed of the typhoon center. The wind map data includes the normalized wind speed data of the ground grid points which are corresponding to the positions of the track of the typhoon at the same time. The original wind speed data of the ground grid points comes through the digitalization of the typhoon track and wind speed distribution diagram. No matter where the typhoon moves, the ground grid points are stationary, and for every typhoon at a certain time and a certain position, there is a wind speed distribution diagram that is relative to the ground and can be digitalized. Hence, every ground grid point corresponding to the track position of every typhoon has the corresponding highest wind speed data, and the normalized extreme wind speed can be obtained by the highest wind speed divided by the highest wind speed of the center of the typhoon. Moreover, the real monitoring spot has wind speed monitoring data, and the normalized extreme wind speed data can be obtained by the same processing. Hence, when a new typhoon (or called a target typhoon) occurs or arrives at a certain position, one can image that the target typhoon may repeat the same course as a historical typhoon so as to receive the similar acceleration or deceleration effect. Therefore, by multiplying the highest wind speed of the center of the target typhoon and the normalized extreme wind speed together, the highest wind speed (extreme wind speed) of the target typhoon repeating a certain historical typhoon during the period of typhoon. Besides, the repeat probability is inversely proportional to the distance between the target typhoon and the historical typhoon.

The wind turbine 13 stores the information from the in-situ computer 24 related to the wind turbines in local wind farms, and the information may contain the wind turbine position, wind speed, power output, operation time, wind turbine specification for the tolerance of wind speed, and maintenance record of the wind turbine.

Referring to FIGS. 1 and 2, the following is the detailed description of the wind energy forecasting method with extreme wind speed prediction function. At first, in the step S10, the central computer 10 receives a set of weather data which contains a set of data of the numerical weather prediction 22, and the weather data is transmitted to the EWWEPT 11 for data collection. The weather data can further contain a set of data of wind monitoring 21 which is promptly received by the central computer 10 and transmitted to the EWWEPT 11 for data collection.

In the step S30, the first model output statistics module 111 of the EWWEPT 11 implements a modification of wind speed and direction with a first model output statistics. The first model output statistics module 111 uses the numerical weather prediction 22 data and wind monitoring 21 data stored in the wind and typhoon database 12 to modify the wind speed and wind direction at the required height of the specific ground grid point for the wind energy prediction at each of the wind farm with a statistics model. In general, the numerical weather prediction 22 updates its prediction every 12 hours. By adding the practical wind monitoring 21 data, the prediction accuracy can be enhanced, and besides, the prediction can be updated in a shorter time, for example one time per ten minutes, so as to increase the update frequency.

In the step S50, the physical model module 112 of the EWWEPT 11 receives the data of wind speed and wind direction modified by the first model output statistics module 111, and modifies the modified wind speed data to that at the position and height of the wind turbine by the calculation according to the land topography, land roughness and obstacle model established in the physical model module 112. In this embodiment, the above-mentioned calculation is performed by a wind flow model. In general, the wind direction acquired by the prediction or monitoring is simplified to show only one angle, for example the north or north-northeast in the condition of eight wind directions or sixteen wind directions, however a certain level of inaccuracy exists here. So, the physical model module 112 of the invention can calculate wind direction in multi angles (for example, the angle of the original prediction or monitoring with the increment or decrement of one degree to fifteen degrees), so as to further derive the condition and probability of variation of the prediction caused by changes of the wind direction, to achieve the purpose of ensemble forecasting, keep the variation level of wind energy, and support wind turbine controlling and wind energy distribution strategy.

In the step S70, the second model output statistics module 113 inputs the historical data from the prediction and the practical output of wind turbine into the statistics model (e.g. nonlinear statistics model, such as back propagation artificial neural network (BP)) and hybrid genetic algorithm-BP neural networks (GABP) for beforehand training. Besides, the collection of prediction data and error data can be used periodically to adjust the parameters continuously so as to improve the accuracy of the wind energy prediction.

The step S80 is predicting damage caused by the extreme wind speed of typhoon. In the step S80, the extreme wind speed prediction module 115 can find the historical typhoons related to the target typhoon (such as the latest discovered typhoon or the typhoon occurring at a certain position needed to keep an eye on), and calculate the probable extreme wind speed and probability during the typhoon invading period or calculate the probability of exceeding a specific maximum extreme wind speed, and thereby the magnitude of the damage risk can be judged. In the embodiment, the step S80 can further includes the four sub-steps S81~S84, as follows.

In the step S81, when the new typhoon warning is issued, the highest wind speed and the current position of the typhoon's center or the future position of the typhoon that is issued by the weather institution can be input into the extreme wind prediction module 115. Then, the issued typhoon is regarded as the target typhoon T, and an interested range is defined within a circle that has the center represented by the central position of the target typhoon T with the radius R. Therefore, the interested range can be changed according to the state and position (i.e. the moving path) of the target typhoon, including the past path position or predicted position of the typhoon.

Figure 3A:
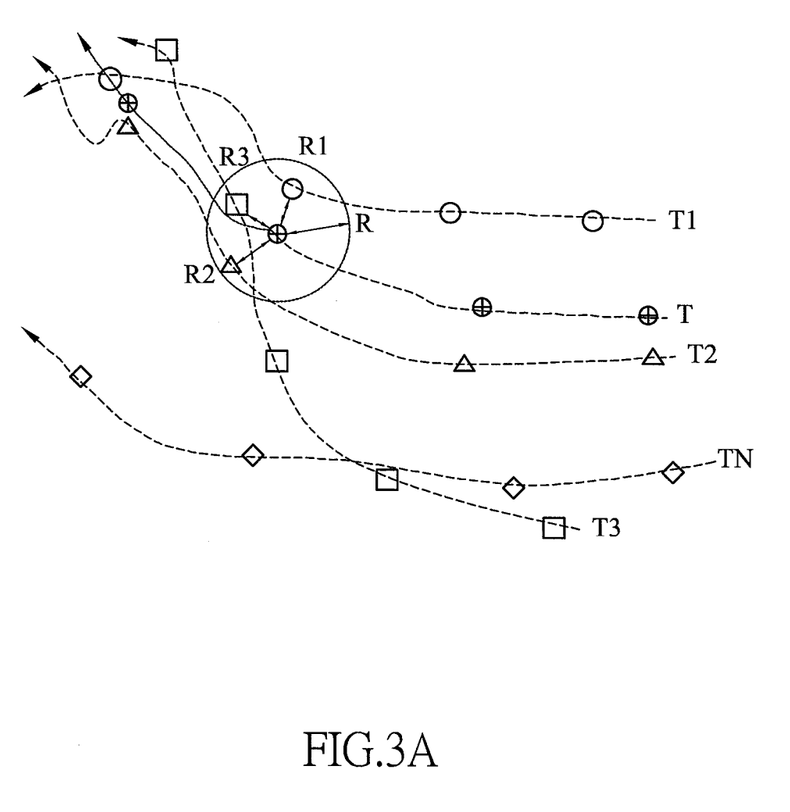
FIGS. 3A to 3D are diagrams showing the data of the wind energy forecasting method of the preferred embodiment of the invention.

Because the tracks of typhoons are not completely the same, the interested range can help acquire the data of the typhoons close to the target typhoon T, resulting in the expansion of the data basis of the extreme wind estimation. As shown in FIG. 3A, the extreme wind prediction module 115 can find all the historical typhoons T1~T3 ever passing through within the interested range according to the position of the target typhoon T and the interested range. Subsequently, the extreme wind prediction module 115 can find the normalized extreme wind speed data of the ground grid points corresponding to the tracks of the historical typhoons T1~T3, and therefrom the probable extreme wind speed of the target typhoon T can be derived, as illustrated in the step S82.

In the step S82, a target ground grid point is chosen, which can be the grid point the closest to the wind turbine, so it can be located inside or outside the interested range. A plurality of normalized extreme wind speeds of the historical typhoons T1, T2, T3 occurring at the target ground grid point are obtained, and each of the historical typhoons corresponds to the value of a normalized extreme wind speed. Physically, the highest wind speeds occurring at the target ground grid point due to the historical typhoons T1, T2, T3 are obtained, which are the highest wind speeds occurring at the target ground grid point influenced by the historical typhoons T1, T2, T3, and the highest wind speeds are divided by the highest wind speeds of the centers of the historical typhoons T1, T2, T3 to obtain the normalized extreme wind speeds of the historical typhoons T1, T2, T3 corresponding to the target ground grid point, respectively.

Then, in a manner of inverse calculation, the actual or expected highest wind speed of the center of the target typhoon T is multiplied by the above-mentioned normalized extreme wind speeds of the historical typhoons T1, T2, T3 corresponding to the target ground grid point, and the probable extreme wind speed at the target ground grid point caused by the target typhoon T can be thus obtained. Since there are plural historical typhoons T1, T2, T3 within the interested range, the plural probable extreme wind speeds for the target ground grid point can be obtained.

Subsequently, by using the shortest distances R1~R3 from the historical typhoons T1~T3 to the target typhoon T, the probability of the historical typhoons T1~T3 causing the extreme wind speeds can be derived. Because the probability of the target typhoon T repeating some historical typhoon T1, T2 or T3 is inversely proportional to the shortest distances R1~R3 of the historical typhoons T1~T3, the probable extreme wind speeds at the target ground grid point of the historical typhoon T1, T2, T3 are arranged in descending or ascending order and the shortest distances corresponding to the extreme wind speeds are also arranged, which are also the shortest distance between the historical typhoon T1, T2, T3 and the target typhoon within the interested range, and then the probability is calculation by accumulation to derive the probability that a particular extreme wind speed occurs at every ground grid point.

Figure 3B:
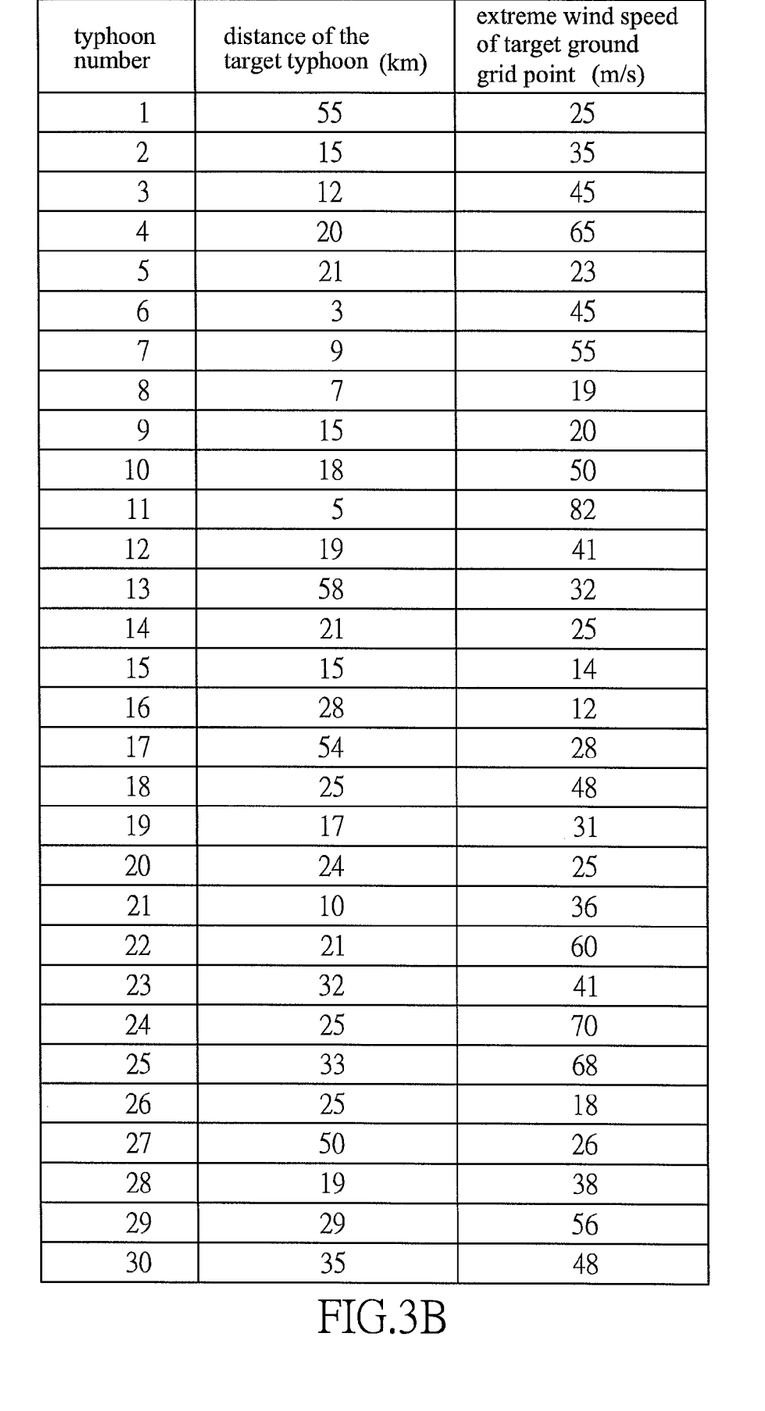
Figure 3C:
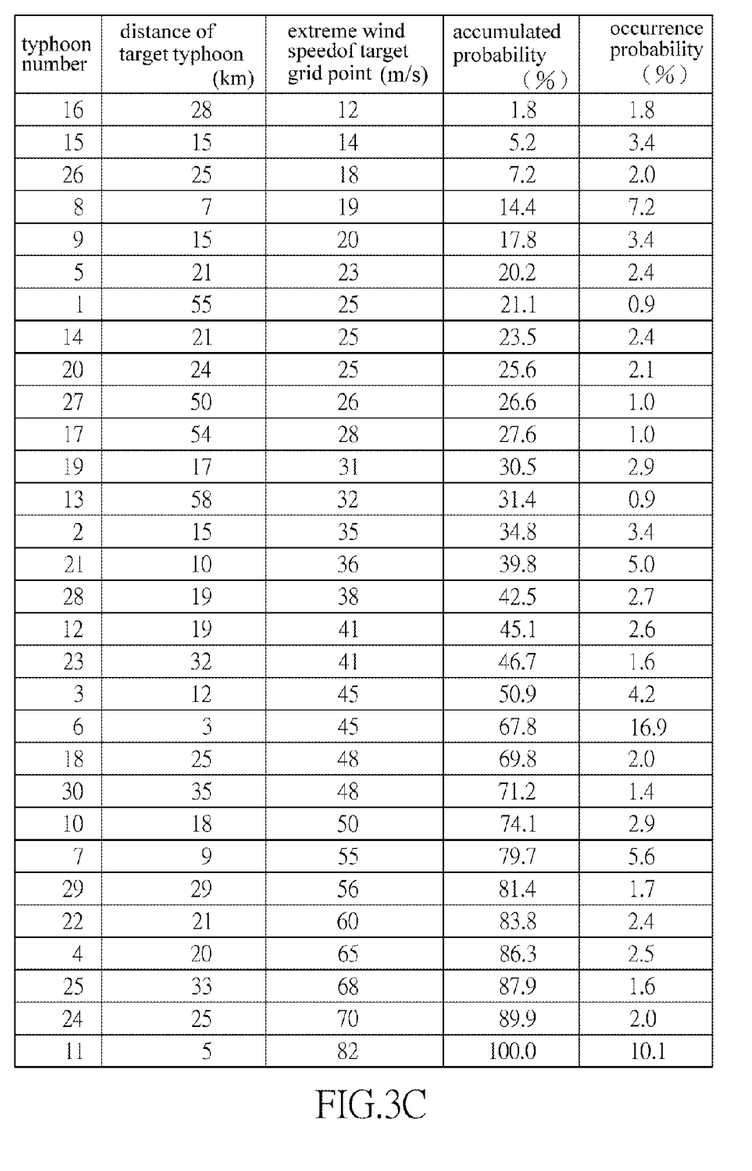

FIGS. 3B and 3C show the occurrence probability calculation of the extreme wind speed for a certain ground grid point in the interested range caused by 30 historical typhoons for example. In FIG. 3B, the shortest distances of the 30 historical typhoons and the probable extreme wind speeds occurs at the target ground grid point caused thereby are shown. The below calculation is implemented to obtain the occurrence probabilities of the extreme wind speeds as shown in FIG. 3C. The calculation is as follows. There are 30 historical typhoons, the respective historical typhoons are at distances R1, R2, R3, . . . , Rn (as shown in FIG. 3B) from the target typhoon, n is equal to 30. Since the probability of causing the same result is lower when the distance is farther, the probability is assumed to be inversely proportional to the distance. Then, the ratio of the occurrence probabilities of the extreme wind speeds of the target typhoon T similar to the historical typhoons is $$\frac{1}{R1}:\frac{1}{R2}:\frac{1}{R3}:\cdots:\frac{1}{Rn},$$

and a setting is $$\Sigma = \frac{\frac{1}{R1}+\frac{1}{R2}+\frac{1}{R3}+\ldots+\frac{1}{Rn}}{100},$$

so the occurrence probabilities of the extreme wind speeds of the target typhoon similar to the respective historical typhoons are $$\frac{1}{R1\times\Sigma}\%,\ \frac{1}{R2\times\Sigma}\%,\ \frac{1}{R3\times\Sigma}\%,\ \ldots,\ \frac{1}{Rn\times\Sigma}\%,$$

and their sum is equal to 100%.

Figure 3D:
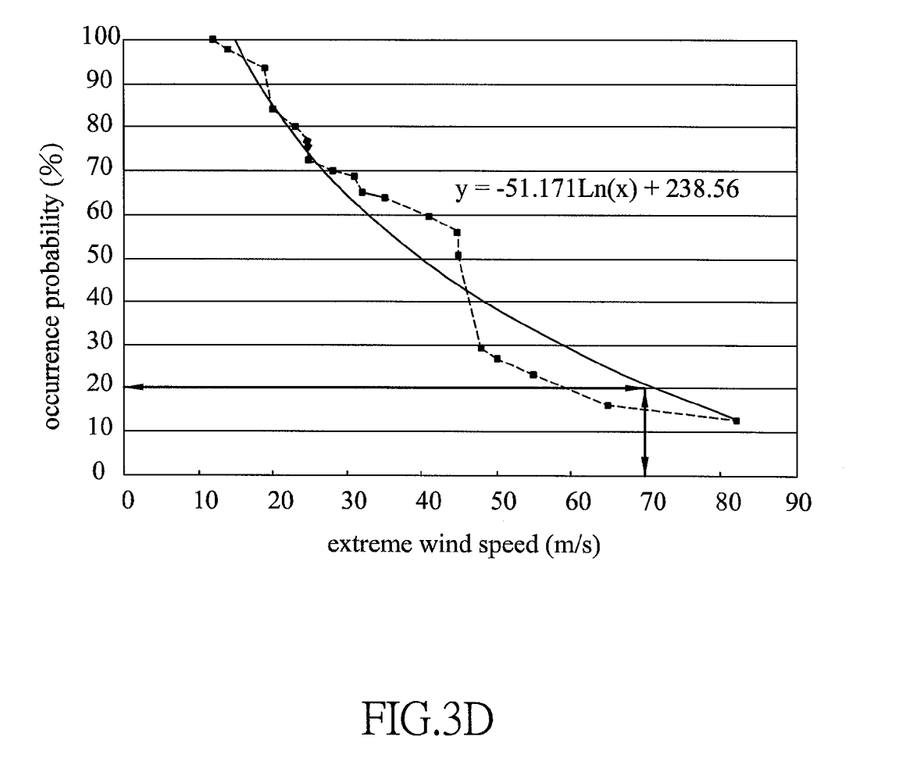

Then, the data can be processed in a progressively decreasing manner in ascending order (as shown in FIG. 3C) and the occurrence probabilities of the extreme wind speeds of the target typhoon T can be thus obtained. The extreme wind speeds are just the value of the extreme wind speeds of a certain ground grid point as shown in FIG. 3B, so they will be varied with different viewing position. Moreover, the data drafting can be used to form an occurrence probability distribution diagram by regarding the particular extreme wind speeds as the X coordinate and the occurrence probability of the extreme wind speeds as the Y coordinate. In combination with the trend curve, the occurrence probability curve of the extreme wind speed can be obtained as shown in FIG. 3D.

In the step S83, the occurrence probability of the extreme wind speeds at the target ground grid point can be modified by a physical model to modify the target ground grid point to the position and height of the wind turbine to obtain the extreme wind speed of the actual position and height of the wind turbine. In this embodiment, the physical model is the wind flow model to modify, through land topography and height, the wind speed and direction of the target ground grid point to the wind speed and direction of the wind turbine. Physically, the wind flow model can be WAsP (the Wind Atlas Analysis and Application Program), wherein the obstacle, land topography and land roughness of the target ground grid point and the wind turbine are inputted to the physical model, WAsP can calculate the influence of the obstacle, land topography and land roughness on the wind speed and direction with different wind directions according to every position and height in sections to generate a modification factor of every section of the wind direction.

In the embodiment, the wind energy forecasting method with extreme wind speed prediction function can further includes determine the level of damage risk according to the extreme wind speed (S84). As shown in FIG. 2, the EWWEPT 11 can obtain the specification for the tolerance of wind strength of the wind turbine from the wind turbine database 13, and compare that with the value and the probability of the extreme wind speed at the position and height of the wind turbine acquired from the step S83 to determine the damage risk caused by the extreme wind speed of typhoon. If the risk is larger than a predetermined level, a warning message will be sent to the user 30 and the in-situ computer 24 by the central computer 24. The risk can be divided into multi levels, such as a notice, an alarm or an emergency action. The warning message can be broadcasted through network or short message service (SMS) to the stakeholders. According to different models of the wind turbine and specifications for the tolerance of wind strength, proper operation plans of the wind turbine can be looked up to provide the user 30 as the decision strategy.

In the embodiment, the wind energy forecasting method with extreme wind speed prediction function can further include the step S90 of generating a prediction result and releasing the prediction result. After integrating the wind speed data at the position of the wind turbine modified by the physical model module 112, re-calculation can be implemented by the above statistics model to produce the extreme wind speed and the wind prediction result of the respective wind turbine or the wind farm. The prediction result includes the wind power output of each wind turbine of each wind farm, and the prediction results can be stored in a forecasting database 14 for the accuracy estimation of the prediction and for the training of the second model output statistics module 113. The prediction result can be released; for example, the wind energy prediction result is sent to the user 30 for the reference of operation, power distribution, maintenance, adjusting and shut down of the wind turbine so as to increase the efficiency and economic benefits of the wind farms or the wind turbines.

To be noted, the typhoon used in the invention means the violent tropical cyclone that is formed in the western part of the North Pacific Ocean and South Chine Sea. Such violent tropical cyclone is named differently in different areas. For example, it is called hurricane in the western part of the Atlantic, the Caribbean, the Gulf of Mexico, the eastern part of the North Pacific Ocean. Accordingly, the typhoon and hurricane are the different names due to the different areas, while the violent tropical cyclone is called typhoon in the invention just for example to make a description.

Figure 4:
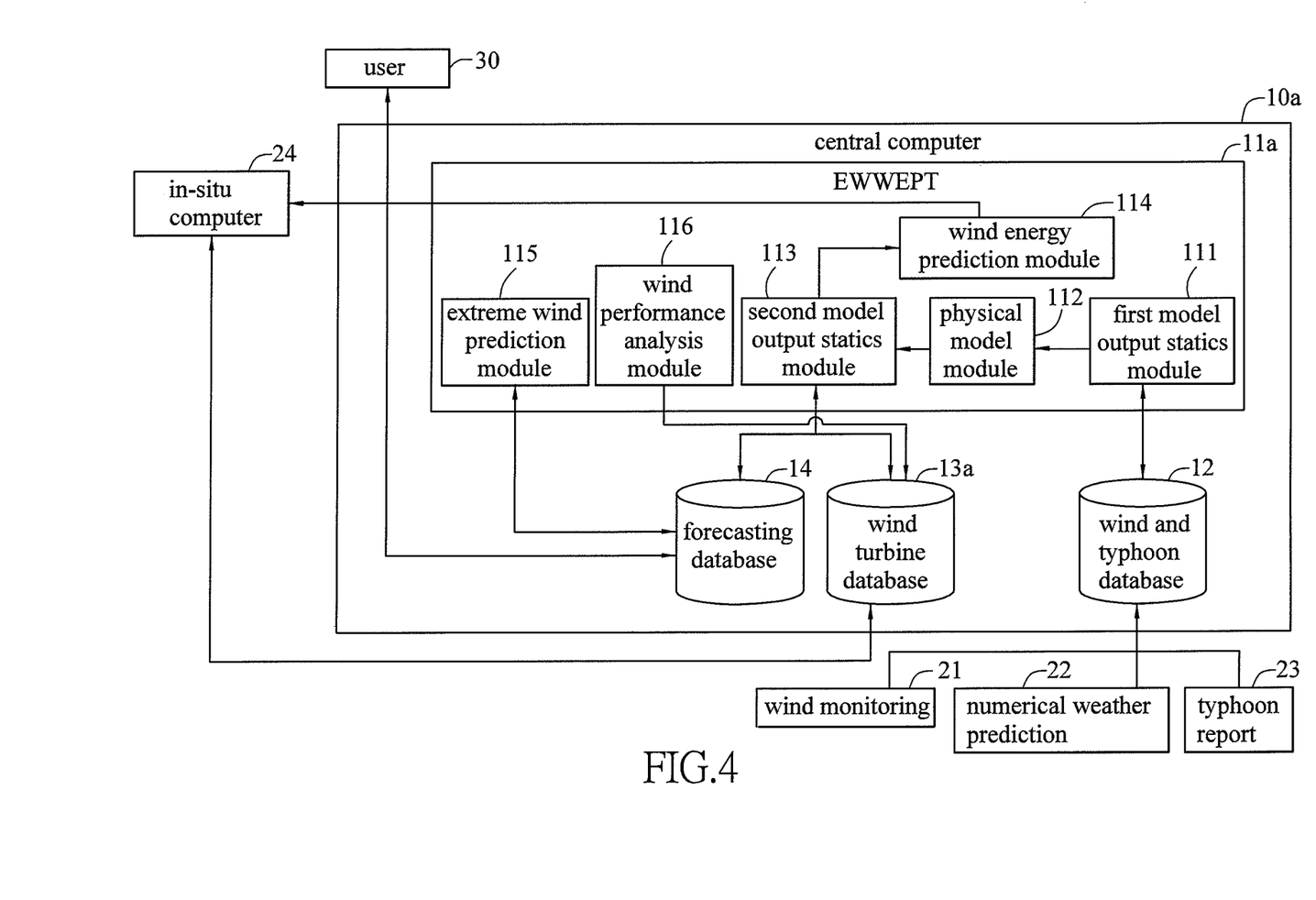
FIG. 4 is a block diagram of another central computer cooperated with the wind energy forecasting method of the preferred embodiment of the invention.

FIG. 4 is a diagram of another central computer cooperated with the wind energy forecasting method. Different from the structure of FIG. 2, the EWWEPT 11a of the central computer 10a of the embodiment further includes a wind turbine performance analysis module 116, and the wind turbine database 13a further has the current and historical performance curve of the wind turbine performance. The wind performance analysis module 116 can implement statistical analysis and edit the performance curve of respective wind turbine according to the wind speed data and wind power output data of the wind turbine stored in the wind turbine database 13a. The wind turbine performance curve of the wind turbine performance analysis module 116 and the wind turbine data acquired by the monitoring of the in-situ computer 24 are output and stored in the wind turbine database 13a.

The EWWEPT 11a predicts the power output of each wind turbine that just leaved the factory according to the default wind speed and default performance curve the power output of the wind turbine and the default prediction value of the wind speed. After a period of usage, the wind turbine performance analysis module 116 of the EWWEPT 11a can implement a statistical analysis of the wind speed data and the wind power output data of the wind turbine collected during the period of usage according to the practical observation data of the in-situ computer 24, to draw the newer and more practical performance curve of the wind speed and the power output of the wind turbine so as to improve the accuracy of wind energy forecasting. The historical data of wind turbine performance curves can be stored for the comparison with the latest data of wind turbine performance curves by the wind turbine performance analysis module 116, which can figure out the variation of the power output performance as the reference of the subsequent maintenance, update and error analysis. The analysis results above can be fed back to each wind farm through network.

In summary, in the wind energy forecasting method with extreme wind speed prediction function of the invention, the position relation between the historical typhoon and the target typhoon is used and the probable extreme wind speed of the historical typhoon for a target ground grid point is obtained. Thereby, the occurrence probability of the extreme wind speeds can be obtained by calculation according to the shortest distance between the historical typhoon and the target typhoon. Therefore, the extreme wind speed prediction of the typhoon can be implemented and the warning mechanism can be established to secure the wind power generation system.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A non-transient storage medium having a computer-executable method of predicting the occurrence probability of extreme wind speed, which is executed by a CPU as the following steps of:

obtaining an interested range in relation to a target typhoon serving as the center and obtaining a plurality of historical typhoons within the interested range from a wind and typhoon database;

obtaining a plurality of shortest distances from the respective historical typhoons to the target typhoon within the interested range;

choosing a target ground grid point and obtaining a plurality of normalized extreme wind speeds of the respective historical typhoons corresponding to the target ground grid point;

obtaining a plurality of extreme wind speeds probable for the target ground grid point by calculation according to the normalized extreme wind speeds and the highest wind speed of the center of the target typhoon;

arranging the extreme wind speeds in descending order, arranging the shortest distances corresponding to the respective extreme wind speeds, and obtaining the occurrence probability of the extreme wind speeds at the target ground grid point according to a formula, wherein the occurrence probability of the wind speed values of the normalized extreme wind speed formed at the target ground grid point is based on the following formula:

the respective historical typhoons are at distances R1, R2, R3, ..., Rn from the target typhoon, the ratio of the extreme wind speeds of the occurrence probabilities of the historical typhoons is $$\frac{1}{R1}:\frac{1}{R2}:\frac{1}{R3}:\cdots:\frac{1}{Rn},$$

and a setting is $$\Sigma = \frac{\frac{1}{R1} + \frac{1}{R2} + \frac{1}{R3} + \cdots + \frac{1}{Rn}}{100},$$

so the occurrence probabilities of the extreme wind speeds of the respective historical typhoons are $$\frac{1}{R1 \times \Sigma}\%, \frac{1}{R2 \times \Sigma}\%, \frac{1}{R3 \times \Sigma}\%, \cdots, \frac{1}{Rn \times \Sigma}\%;$$

and controlling operation of a wind turbine based on the occurrence probabilities.

2. The non-transient storage medium as recited in claim 1, wherein, according to the normalized extreme wind speeds and the highest wind speed of the center of the target typhoon, the normalized extreme wind speeds of the respective historical typhoons corresponding to the target ground grid point and the highest wind speed of the center of the target typhoon are multiplied together to obtain the extreme wind speeds.

3. The non-transient storage medium as recited in claim 2, wherein each of the extreme wind speeds has the corresponding shortest distance of the historical typhoon.

4. The non-transient storage medium as recited in claim 1, wherein the computer-executable method of predicting the occurrence probability of extreme wind speed further comprises the following step of:
forming an occurrence probability distribution diagram according to the extreme wind speeds and the occurrence probabilities of the extreme wind speeds, and adding a trend curve to the occurrence probability distribution diagram to form an occurrence probability curve of extreme wind speed.

5. The non-transient storage medium as recited in claim 1, wherein the computer-executable method of predicting the occurrence probability of extreme wind speed further comprises the following step of:
modifying the occurrence probabilities of the extreme wind speeds occurring at the target ground grid point by a physical model to modify the target ground grid point to the height or position of a wind turbine.

6. The non-transient storage medium as recited in claim 5, wherein the physical model is a wind flow model to modify, through land topography and height, the wind speed and direction of the target ground grid point to the wind speed and direction of the wind turbine.

7. The non-transient storage medium as recited in claim 1, wherein the interested range is changed according to the state and position of the target typhoon.

8. A computer-executable method of predicting the occurrence probability of extreme wind speed, which is executed by a CPU as the following steps of:

obtaining an interested range in relation to a target typhoon serving as the center and obtaining a plurality of historical typhoons within the interested range from a wind and typhoon database;
obtaining a plurality of shortest distances from the respective historical typhoons to the target typhoon within the interested range;
choosing a target ground grid point and obtaining a plurality of normalized extreme wind speeds of the respective historical typhoons corresponding to the target ground grid point;
obtaining a plurality of extreme wind speeds probable for the target ground grid point by calculation according to the normalized extreme wind speeds and the highest wind speed of the center of the target typhoon;
arranging the extreme wind speeds in descending order, arranging the shortest distances corresponding to the respective extreme wind speeds, and obtaining the occurrence probability of the extreme wind speeds at the target ground grid point according to a formula,
wherein the occurrence probability of the wind speed values of the normalized extreme wind speeds formed at the target ground grid point is based on the following formula:
the respective historical typhoons are at distances R1, R2, R3, ..., Rn from the target typhoon, the ratio of the occurrence probabilities of the extreme wind speeds of the historical typhoons is $$\frac{1}{R1}:\frac{1}{R2}:\frac{1}{R3}:\cdots:\frac{1}{Rn},$$

and a setting is $$\Sigma = \frac{\frac{1}{R1} + \frac{1}{R2} + \frac{1}{R3} + \cdots + \frac{1}{Rn}}{100},$$

so the occurrence probabilities of the extreme wind speeds of the respective historical typhoons are;

$$\frac{1}{R1 \times \Sigma}\%, \frac{1}{R2 \times \Sigma}\%, \frac{1}{R3 \times \Sigma}\%, \cdots, \frac{1}{Rn \times \Sigma}\%;$$

and controlling operation of a wind turbine based on the occurrence probabilities.

9. The computer-executable method of predicting the occurrence probability of extreme wind speed as recited in claim 8, wherein, according to the normalized extreme wind speeds and the highest wind speed of the center of the target typhoon, the normalized extreme wind speeds of the respective historical typhoons corresponding to the target ground grid point and the highest wind speed of the center of the target typhoon are multiplied together to obtain the extreme wind speeds.

10. The non-transient storage medium as recited in claim 9, wherein each of the extreme wind speeds has the corresponding shortest distance of the historical typhoon.

11. The computer-executable method of predicting the occurrence probability of extreme wind speed as recited in claim 8, further comprising the following step of:
forming an occurrence probability distribution diagram according to the extreme wind speeds and the occurrence probabilities of the extreme wind speeds, and adding a trend curve to the occurrence probability distribution diagram to form an occurrence probability curve of extreme wind speed.

12. The computer-executable method of predicting the occurrence probability of extreme wind speed as recited in claim 8, further comprising the following step of:
   modifying the occurrence probabilities of the extreme wind speeds occurring at the target ground grid point by a physical model to modify the target ground grid point to the height or position of a wind turbine.

13. The computer-executable method of predicting the occurrence probability of extreme wind speed as recited in claim 12, wherein the physical model is a wind flow model to modify, through land topography and height, the wind speed and direction of the target ground grid point to the wind speed and direction of the wind turbine.

14. The computer-executable method of predicting the occurrence probability of extreme wind speed as recited in claim 8, wherein the interested range is changed according to the state and position of the target typhoon.

* * * * *